Feb. 17, 1959   A. B. JACOBSEN   2,874,378
DATA TRANSMISSION SYSTEM
Filed Nov. 30, 1945   5 Sheets-Sheet 1

INVENTOR
ANDREW B. JACOBSEN
BY
ATTORNEY

Feb. 17, 1959     A. B. JACOBSEN     2,874,378
DATA TRANSMISSION SYSTEM
Filed Nov. 30, 1945     5 Sheets-Sheet 2

INVENTOR
ANDREW B. JACOBSEN
BY
ATTORNEY

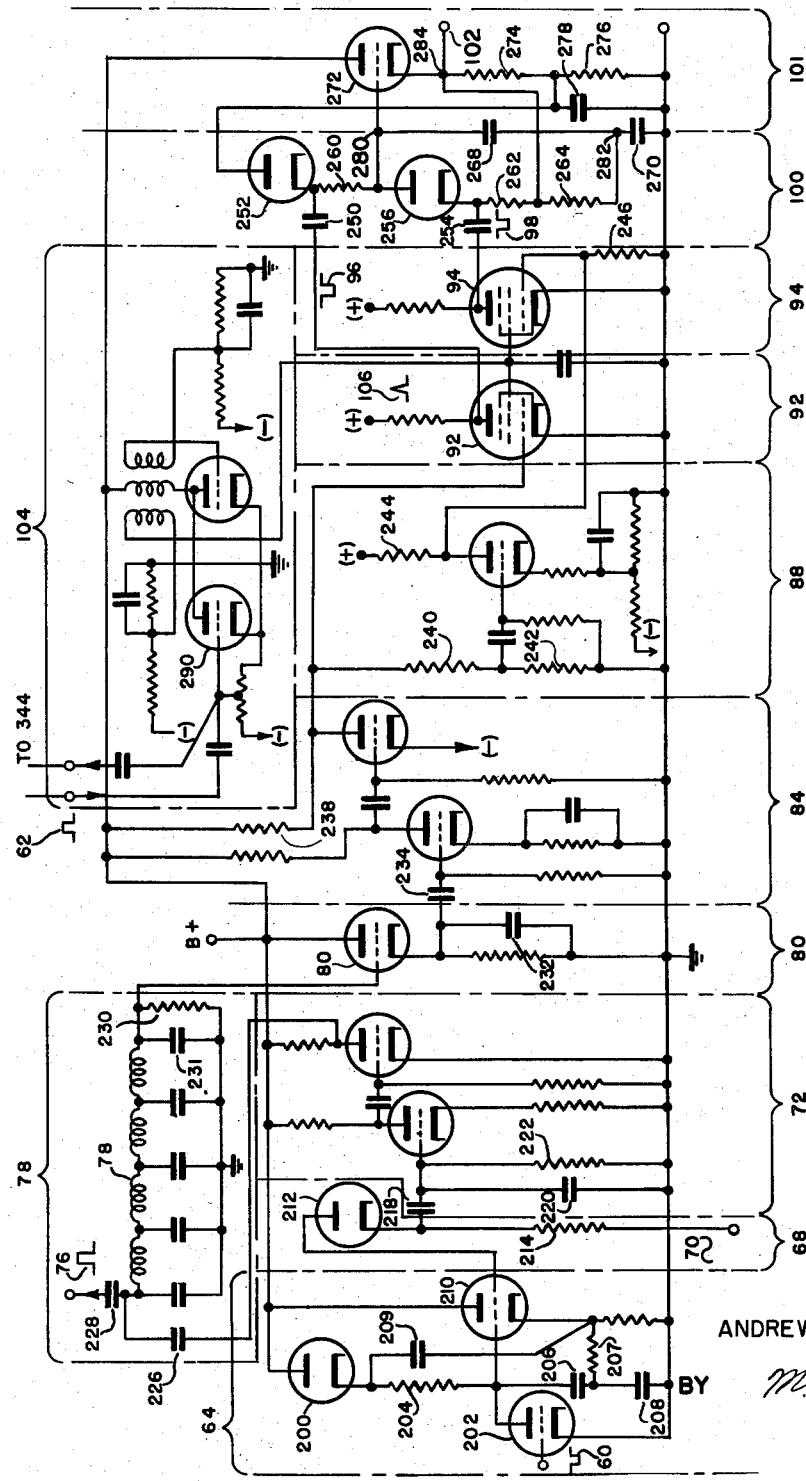

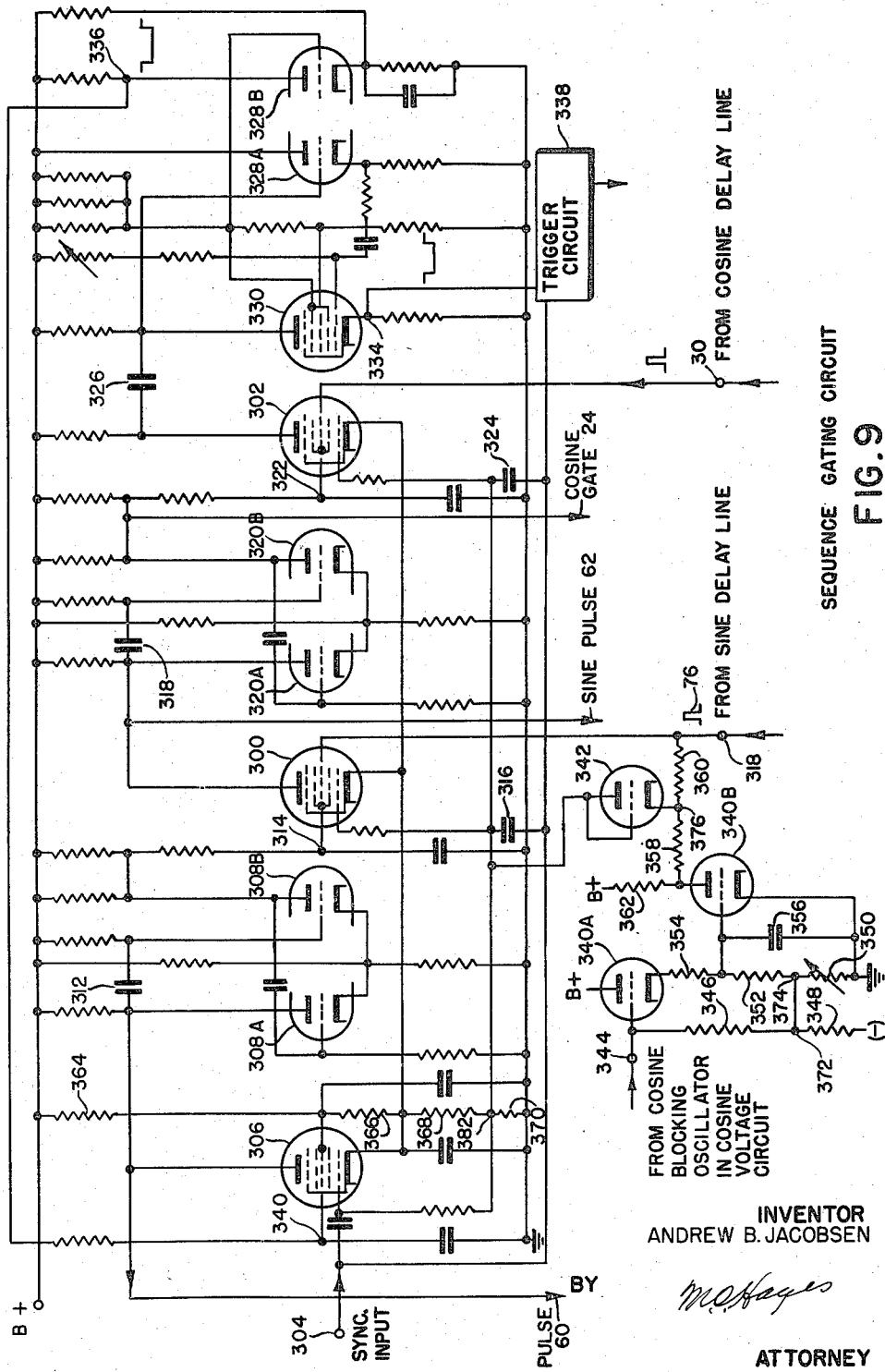

United States Patent Office 2,874,378
Patented Feb. 17, 1959

2,874,378

DATA TRANSMISSION SYSTEM

Andrew B. Jacobsen, Somerville, Mass., assignor, by mesne assignments, to the United States of America as represented by the Secretary of the Navy Application November 30, 1945, Serial No. 631,956

9 Claims. (Cl. 343—6)

This invention relates to an improved data transmission system for producing remote synchronous rotation from position data in the form of pulses.

Remote radar apparatus has been developed to present radar information via a radio relay link from a radar search system located separate from the indicators. In such a system it is necessary to provide an accurate and dependable means to synchronize the sweeps of the indicators with the scanning movement of the antenna of the remote search radar. In my copending application Serial No. 631,746, filed November 29, 1945, now Patent No. 2,643,333, issued June 23, 1953, I disclosed a system in which a basic pulse occurs at the start of each repetition cycle, and is the fixed reference point, recurring at precisely equal intervals. Following the basic pulse comes the sine pulse, and the time interval from the basic pulse to the sine pulse is proportional to the sine of the azimuth angle. This time interval therefore varies continually, as the scanning antenna rotates. Following the sine pulse comes the cosine pulse, and the time interval from the sine pulse to the cosine pulse is proportional to the cosine of the azimuth angle, so that this time interval also varies as the antenna rotates. Following the cosine pulse there is the transmitter pulse. This last signal is concerned with triggering of the shipboard indicator sweeps, so that they will be synchronized in range with the airborne indicator sweeps.

The primary purpose of this invention is to improve the data transmission system disclosed in my copending application referred to above.

In a system of this character, the time position modulation of the sine (or cosine) pulses may be compared with the time position of a pair of adjacent gates, by feeding the pulse and gates to coincidence tubes and differentially combining their outputs. One object of the present invention is to provide a system in which a correction in the proper direction will be obtained no matter how far displaced the incoming pulse may be from the adjacent gates. However, inasmuch as a pulse far removed from anticipated position is more likely to be a spurious pulse, a further object of the invention is to limit the corrective influence of a far-removed pulse. With these objects in view, I provide a pair of step gates having short sloping edges which intersect at the anticipated pulse position, following which the gates extend horizontally for an indefinite distance away from the intersection.

In the above mentioned application a basic pulse was employed to start the operation of a sequence of gates and pulses, in order to synchronize the plan position indicator (hereinafter called PPI) sweeps with the antenna within one cycle and to maintain the synchronization in spite of interference, with the smallest possible error. To do this a system of overlapping gates was employed so that only pulses in proper sequence would be effective. One object of this invention is to provide a method of limiting the effective period for reception of the desired pulses, in order to greatly reduce interference from spurious pulses. With this object in view I provide narrow gates, which may for convenience be called tolerance gates, and I employ triple coincidence circuits such that a sine pulse will not be utilized except in the event of coincidence of a sequence gate and a tolerance gate. The same applies to the cosine pulses.

Another object is to provide a method of preventing the receiver from losing synchronization with the radar antenna even if one or several sync pulses should be missed. A still further object is to provide an accurate synchronization method which reduces inherent errors as much as possible. Both of the foregoing objects are fulfilled by a prediction circuit or electronic velocity-memory circuit.

The prediction is not maintained accurately in the event of failure to receive a large number of the sine or cosine pulses. In such case there will be an error in prediction which may grow to exceed the tolerance provided for by the tolerance gate. In accordance with a further feature and object of my invention, in the event of failure to receive a substantial number, say half, of the sine (or cosine) pulses, the coincidence bias is so changed as not to require coincidence with a tolerance gate.

To accomplish the foregoing objects, and other more specific objects which will hereinafter appear, my invention resides in the circuit elements and their relation one to another as are hereafter described in the following specification. The specification is accompanied by drawings in which:

Fig. 6 is a wiring diagram of the sine voltage circuit shown in Figs. 1 and 3;

Figure 8:
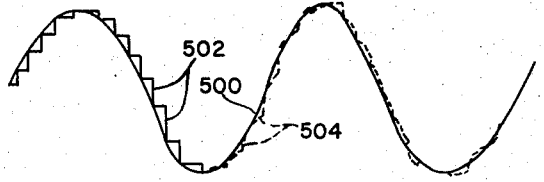

Fig. 8 helps show the operation of the velocity-memory circuit; and

Figure 1:
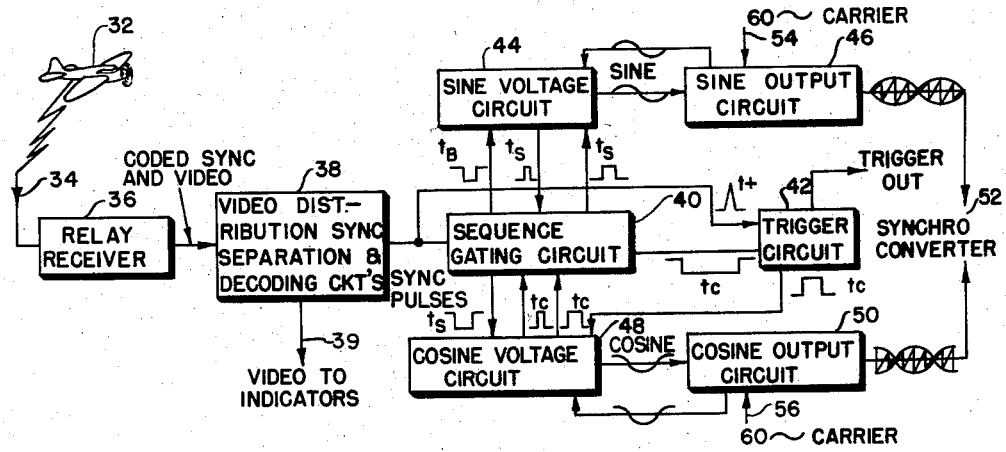
Fig. 1 is a block diagram showing a part of a radar system embodying features of the invention.

Fig. 9 is a wiring diagram of the sequence gating circuit shown in Fig. 1, including improvements forming a part of the present invention.

Referring to the drawings, Fig. 1 gives a block diagram of a synchronization system incorporating features of this invention. The aircraft 32 contains the search radar and other necessary circuits to provide radar data and antenna synchronization (hereinafter abbreviated "sync") data, which is transmitted by relay radio to the shipboard unit shown in the remainder of Fig. 1. The information sent from the aircraft 32 consists of a radio carrier modulated by coded sync pulses and radar video. The relay receiver converts this information to coded sync and video signals which are applied to sync separation and decoding circuits 38. This decoding system is disclosed in my copending application Serial No. 617,365, filed September 19, 1945, now Patent No. 2,772,399. The output from unit 38 consists of video signals fed at 39 to one or more indicators, not shown, and the sync pulses which are applied to a sequence gating circuit 40 and a trigger circuit 42. Up to this point the circuits and operation are the same as the system disclosed in my copending application, Serial No. 631,746, referred to above.

Figure 2:
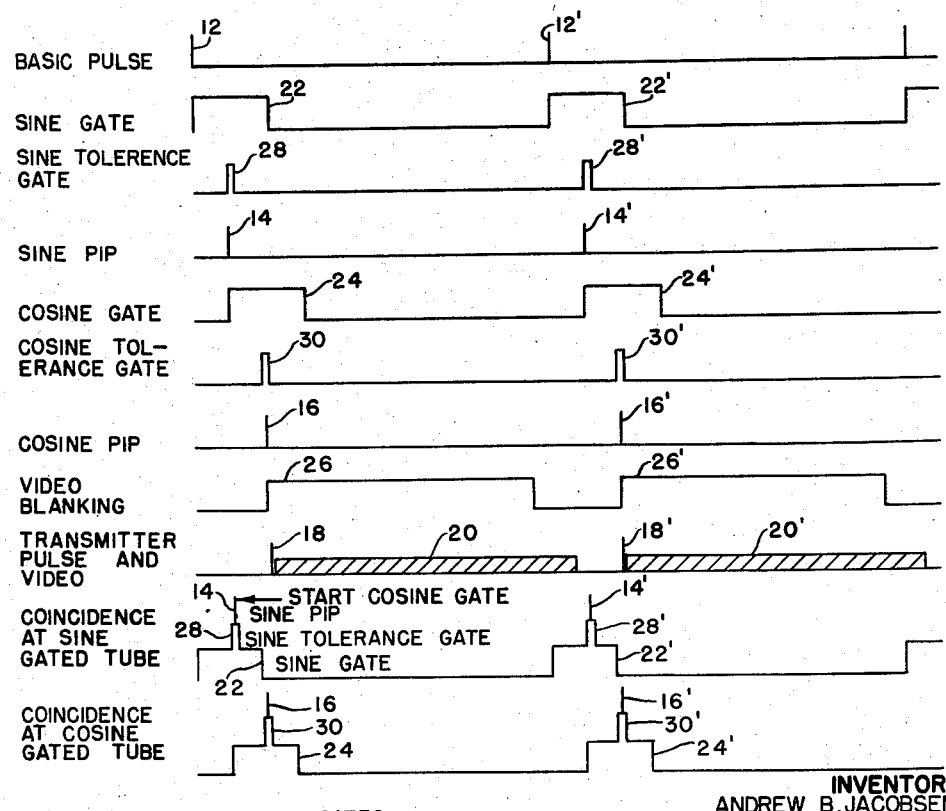
Fig. 2 is a timing diagram explanatory of a part of the invention.

The aircraft transmits both synchronization data and video data. Referring to Fig. 2 the synchronization or angle data comprises a basic pulse 12, a position modulated sine pulse 14, and a position modulated cosine pulse 16. The video information includes a transmission pulse 18, and echo data 20.

In my copending application Serial No. 631,746, previously referred to, it was explained that the basic pulse 12 (Fig. 2) triggers a sine gate 22 long enough to overlap the sine pulse 14 and cosine pulse 16; that the sine pulse 14 triggers a cosine gate 24 long enough to overlap the cosine pulse 16 and transmitter pulse 18; and that the cosine pulse 16 triggers a long gate 26 which overlaps the video transmission, but which terminates prior to the next basic pulse 12'. The arrangement is such that a pulse cannot trigger the sine gate 22' until after termination of the video gate 26, and further that the sine pulse 14 cannot trigger the gate 24 unless the pulse 14 is coincident with the gate 22, and that the pulse 16 cannot trigger the gate 26 unless the pulse 16 is coincident with the gate 24. This circle of gates is termed sequence gating, and gates 22, 24 and 26 may be referred to as sequence gates.

In accordance with the present invention I provide additional narrow tolerance gates to closely limit the period of time during which a pulse will be effective, thereby excluding many spurious pulses. For this purpose, advantage is taken of the fact that the approximate position of any succeeding sine pulse may be predicted from a preceding sine pulse, and a limited time (in this case 50 microseconds), provides ample tolerance within which the succeeding pulse should follow. In Fig. 2 a sine tolerance gate is indicated at 28, and a cosine tolerance gate is indicated at 30. The gate 28 straddles the position of the sine pulse 14, and the gate 30 straddles the position of the cosine pulse 16. In practice, the pulses and gates are fed to triple coincidence circuits so that the sine pulse 14 will not be effective unless it is coincident with both the tolerance gate 28 and the sequence gate 22. This is indicated schematically by the pedestal arrangement at the bottom of Fig. 2. Similarly, the cosine pulse 16 is not effective unless coincident with the tolerance gate 30 and the sequence gate 24, and this also is schematically indicated by the pedestal arrangement at the bottom of Fig. 2.

Reverting to Fig. 1, the sequence gating circuit 40 generates sequence gates from the applied sync pulses, provided they are coincident with the tolerance gates received from a sine voltage circuit 44 and a cosine voltage circuit 48. The sine voltage circuit 44 receives two signals from the sequence gating circuit 40, one corresponding in time to the basic pulse, and the other to the time of the sine pulse, and from these develops a modulator wave which is used to control the modulation of a 60 cycle signal 54 applied to the sine output circuit 46. The modulated 60 cycle output is used to drive one winding of the synchro converter 52. The cosine voltage circuit receives a signal corresponding in time to the cosine pulse, and other occurring at the time of the cosine pulse, and from these develops a modulator wave which is used to control the modulation of the 60 cycle signal 56 applied to the cosine output circuit 50. The modulated 60 cycle output is used to drive the other winding of the synchro converter 52 so that it follows the antenna. In addition to providing the gates (22 and 24 in Fig. 2) which control these circuits, the sequence gating circuit 40 also produces a gate (26 in Fig. 2) at the time of the cosine pulse which blocks out all following signals, which might be taken for sync signals, till the time of the next basic pulse. This gate also prevents the trigger circuit 42 from starting the sweeps until after the reception of a complete cycle of sync data.

Figure 3:
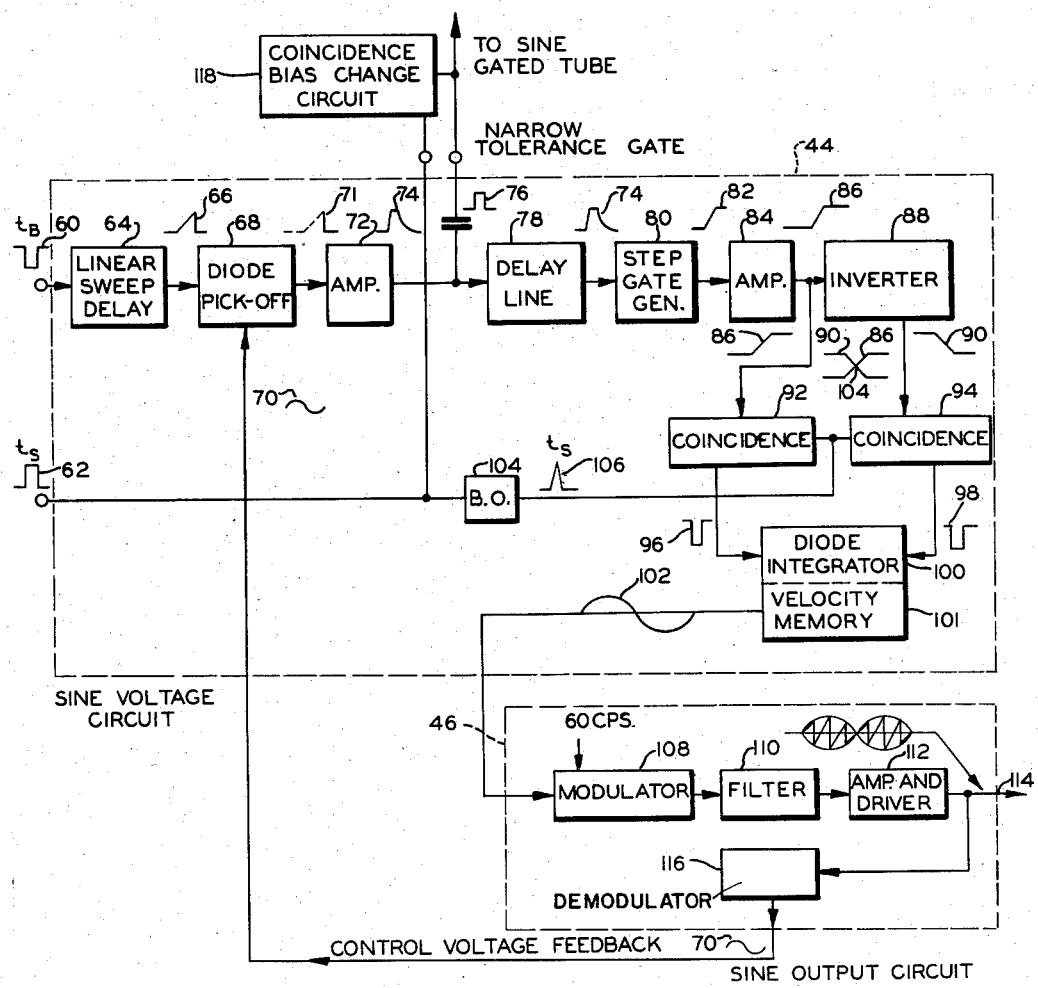
Fig. 3 is a detailed block diagram for the sine voltage circuit and the sine output circuit shown in Fig. 1.

The sine voltage circuit 44 of Fig. 1 is shown in greater detail in Fig. 3 and Fig. 6. Reference will first be made to the block diagram of Fig. 3 to give a general idea of the operation of the circuit. Two signals, a negative 600 microsecond gate 60 starting at the time of the basic pulse and a 600 microsecond gate 62 starting at the time of the sine pulse, are fed to the circuit from the sequence gating circuit. The gate 60 is used to start a linear sweep delay circuit 64 which forms a linear sawtooth wave 66 which is applied to a diode pickoff 68. Also applied to this diode 68 is a control voltage 70 fed back from the sine output circuit enclosed in dotted rectangle 46. This wave form is used to control the pickoff point at which diode 68 conducts and so passes the remainder of the sweep 71. This is then "peaked up" and amplified by the amplifier 72, to get the wave form 74 having a steep leading edge. Pulse 74 is now applied to a delay line 78 which retards the pulse and applies it to a step gate generator 80, where the pulse is stretched to give a step gate 82. This is amplified by amplifier 84 to produce the step wave form 86, which is fed to a first coincidence tube 92. The step gate 86 is also fed through an inverter 88 to produce the opposite step gate 90, which is applied to a second coincidence tube 94.

The 600 microsecond gate 62 having a leading edge corresponding in time to the second sine pulse is applied to a blocking oscillator 104, and this puts out a pip 106 occurring at the time of the sine pulse. This is done to obtain a sharp accurate pulse, which is fed in parallel to the two coincidence tubes 92 and 94.

Now referring back to the pick-off diode 68, the control voltage 70 controls the conduction point of the diode, and thereby controls the start of the gate 74. Thus the gate is caused to move back and forth sinusoidally relative to the basic pulse 60.

Figure 4:
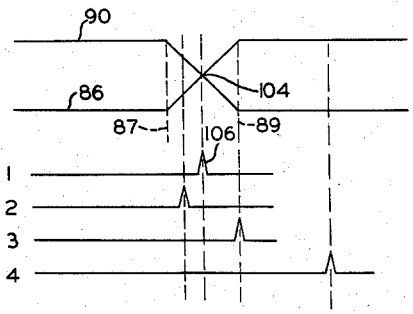
Fig. 4 shows wave forms explanatory of crossed step gates used in the invention.
Figure 5:
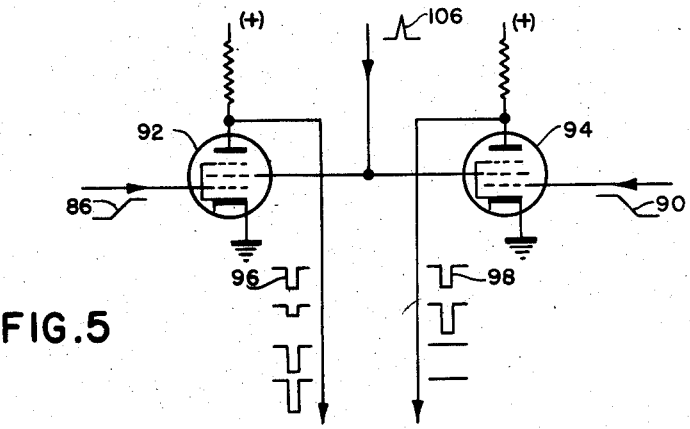
Fig. 5 is explanatory of the operation of the coincidence tubes used with the step gates.

This gate 74 determines the position of the two steps 86 and 90, and if they occur with their crossover point 104 (see also Fig. 4) at the time the pulse 106 comes in, the two output pulses 96 and 98 (see also Fig. 5) from coincidence circuits 92 and 94 will be of equal amplitude, as indicated in Figs. 4 and 5. This means that the control voltage 70 was correct at the time of the pulse. If the pulse 106 occurred at a point different from the crossover point 104, pulses 96 and 98 would differ. One would be larger than the other depending on whether the step gate occurred early or late, as is indicated by the second and third lines in Figs. 4 and 5. An important feature of step gates 86 and 90 shown in the last line of Figs. 4 and 5 is that the corrective voltage of the coincidence tubes 92 and 94 reaches a constant level at either limit of the step 87 or 89, so that pulses too far from the predicted time, which are more likely to be false, do not cause a damagingly large error voltage in the output.

Now the diode integrator 100 (Fig. 3) will apply a corrective voltage to the output, and by summation will produce an approximate sine wave, indicated at 102. In addition there is a velocity-memory circuit 101 which will provide a changing or predicting voltage to cause wave 102 to lie nearer the correct value when the next sine pulse occurs. Thus by a series of predictions between sine pulses and error voltage corrections at the time of the sine pulses, the waveform 102 is formed and follows the position modulated sine pips (or their equivalent, the leading edges of gate 62).

Now wave form 102 is used to modulate a 60 cycle carrier in modulator 108, which after filtering in 110 and amplification in 112, is used from terminal 114 to drive the synchro converter and thence the sweep coils of the P. P. I. tube. A portion of the modulated energy is detected in demodulator 116, thereby producing a wave 70 substantially the same as the modulator wave 102. Wave 70 controls the bias of diode pick-off 68. In fact, waveform 102 might be used to control the diode pick-off bias. However, it is advantageous to feed wave 70 instead of wave 102 back to the diode pick-off 68 because then the error correction includes correction of possible errors in the modulator.

The narrow sine tolerance gate (28 in Fig. 2) is also formed in this sine voltage circuit 44 (Fig. 3). The narrow gate (76 in Fig. 3) is formed by the wave 74 being passed down the delay line 78 and being reflected back to cancel the charge on the line. This results in a pulse equal in width to twice the delay time of the delay line 78. Diode 68 is biased by prediction voltage wave 70 to conduct at a point approximately equal to the length of the delay line ahead of the expected sine pulse. Since the narrow gate is twice as wide as the delay time it will bracket the expected sine pulse.

This narrow gate is fed to one grid of a sine gated tube to control its conduction when coincidence occurs with two other pulses. Also tied to this grid is a coincidence bias changing circuit 118 which will change the bias of this grid so that the narrow tolerance gate will not be necessary for conduction if too many sync pulses are missed for any reason.

Figure 7:
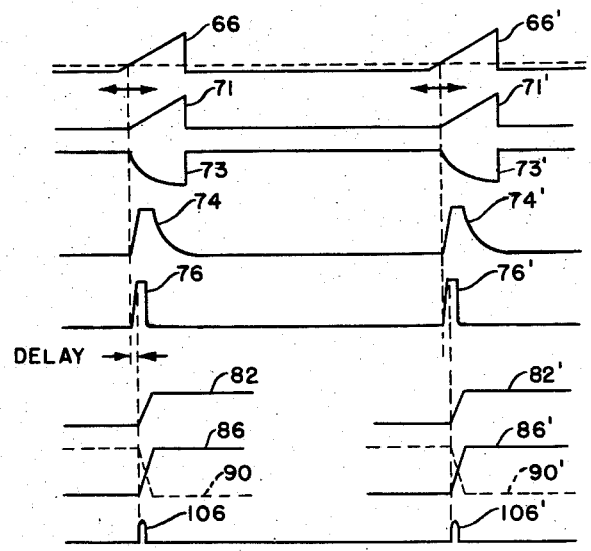
Fig. 7 shows the wave forms in the sine voltage circuit of Fig. 6.

The invention is next explained in greater detail, with reference at first to Figs. 6 and 7 of the drawing. These show the details of the sine voltage circuit and the various pulses occurring in the circuit, with their time relation.

The sine voltage circuit is so named because it develops a sine wave corresponding to the sine component of the remote antenna rotation. This involves continuous repositioning of the step gates. In order to provide a means of positioning the step gates, a control voltage varying linearly with time is employed. For this purpose a linear saw-tooth is developed by the sweep generator circuit generally designated 64. An estimated or predicted sinusoidal control voltage is used along with this saw-tooth wave to control the movement of the step gates at a sinusoidal rate with respect to the start of each sweep, which corresponds to the time of each basic pulse. By positioning the step gates in such a manner as to provide a correction voltage at the time of each sine pulse, the sum of all the correction voltages will add up to form the desired sine wave.

In Fig. 6 the bracket numerals covering parts of the circuit correspond to the numerals in Fig. 3 already described.

Before the sequence gate 60 comes in, tubes 200 and 202 of linear sweep generator 64 are strongly conducting. Tube 202 actually obtains its plate voltage from the cathode of tube 200 through resistor 204, and since 202 is at zero bias most of the B+ drop is across the resistor 204. When the pulse occurs the leading edge of negative pulse 60, occurring at the time of the basic pulse, coming in on the grid of 202 cuts the tube off. Capacitors 206 and 208 now start to charge through tube 200 and resistance 204. The charging wave is fed back from the cathode of the cathode follower 210 through capacitor 209 to the cathode of 200. Thus the cathode of 200 rises with the charging wave so the voltage drop across 204 is reasonably constant. Thus the charging current, the current through 204 remains constant and condensers 206 and 208 charge at a constant rate so that the voltage appearing at the plate of the diode pick-off 212 rises at a linear rate. Linearity of the sweep is improved by the integrating circuit, resistor 207 and capacitor 208, so that the sweep is very linear for the first 350 microseconds which is sufficient for the purpose here.

The linear sweep is applied to the diode pick-off 68. More specifically, it is applied to the plate of the diode pick-off tube 212 directly from the grid of cathode follower 210. A sinusoidally varying D. C. voltage 70 is applied to the cathode of pick-off diode 212 through resistor 214. This predicted voltage amplitude controls the conduction point of the diode pick-off tube 212, causing it to conduct approximately 25 microseconds before the predicted time of the next sine pulse.

The output of the diode pick-off 212 is represented by the waveform 71 (Fig. 7), which is the remainder of the linear sweep 66 after the diode begins conduction. This is coupled through condensers 218 and 220 and resistor 222 (which form a short time constant network to give satisfactory operation at high duty cycle), to the grid of the two stage amplifier 72, the first stage of which produces the wave form 73 as an output to be applied through an R-C coupling circuit to the second stage to give a pulse 74 (Fig. 7) having a steep leading edge. Pulse 74 is applied through condenser 226 to, in this case, a 25 microsecond delay line 78. Pulse 74, which occurs approximately 25 microseconds before the sine pulse, will after delay passing through line 78 be applied to the grid of the step gate generator 80 at approximately the time of the sine pulse.

Line 78 is terminated in resistor 230 and its parallel condenser 231, providing a low impedance which is essentially a short circuit. For this reason pulse 74 when it reaches the end of the line 78 is reflected back with opposite polarity cancelling the charge or pulse on the line. Taking 50 microseconds to go down and return, the pulse 74 is terminated after 50 microseconds to form the narrow 50 microsecond gate 76 (Fig. 7) used in this invention and discussed later.

A cathode follower 80 stretches out the pulse 74 by the action of condenser 232, which takes a moment to charge, so that the cathode rises slower than the grid until the top of pulse 74 is reached, whereupon the condenser holds that voltage for some time after pulse 74 ends, in order to give the long step gate 82 (Fig. 7). The first portion of the charging curve of condenser 232 that is used is so short that the step in wave 82 is linear. Step gate 82 is applied to the two stage amplifier 84 where it is amplified and applied to the control grid of coincidence tube 92 and the inverter 88 which inverts the step 86 to give the opposite step gate 90 which is applied to the control grid of the other coincidence tube 94. Tubes 92 and 94 do not conduct until a positive pulse 106 (Fig. 7) developed by the blocking oscillator 104 from wave 62 is applied to the screen grids of the tubes.

The control grid of tube 92 is biased by a tap between resistors 238 and 240 of the divider network 238, 240 and 242. This bias is such that the tube will not conduct even with pulse 106 applied to the tube until the step gate 86 starts to rise, and at the end of the step gate conducts heavily. Tube 94 on the other hand is biased by a tap from between 244 and 246 of the voltage divider made up of the two resistors, and conducts heavily when pulse 106 is applied, but conducts less as the step gate 90 is decreased, and cuts off at the end of the step gate 90. Because of this bias arrangement it is evident that the output from each of the two tubes 92 and 94 will be negative pulses 96 and 98 of different amplitude, unless the pulse 106 occurs at the center or crossover point 104 of the step gates 86 and 90, as was shown in Fig. 4. Pulse 96 from the plate of tube 92 is coupled through condenser 250 to the cathode of diode 252 in the integrator 100, and pulse 98 from the plate of 94 is coupled through condenser 254 to the cathode of the other diode 256 in the integrator. The outputs from the coincidence tubes 92 and 94 will vary in size depending on how accurately the position of the step gates occurred with respect to the sine pulse. The difference in these pulses will be proportional to the error in the location of the step gates. The integrator circuit 100, which is to be discussed next, is used to combine these signals from the coincidence tubes to get a voltage proportional to their difference. The sum of these error voltages will give a voltage output which will vary sinusoidally in time with the sync pulse. In addition to this it is desirable to automatically change or adjust this voltage between each sine pulse in the predicted direction of the next sine pulse, in order to get greater accuracy. A velocity memory circuit is provided to accomplish this.

The integrator and velocity-memory circuits 100 and 101 are composed of diodes 252, 256 and cathode follower 272. Tube 272 is connected from the power supply in series with load resistors 274 and 276. Diode 252 obtains bias from the tap between resistors 274 and 276, and connects through load resistor 260 to the plate of diode 256. Diode 256 obtains its bias voltage from the grid to cathode voltage of tube 272. Resistor 262 acts as a load resistor for diode 256, and resistor 264 serves as a coupling resistor from point 282 (between the integrating capacitors 268 and 270) to the cathode of tube 272. The output is taken at 280 from the plate of tube 256. When the pulses 96 and 98 (Figs. 3, 5 and 6) coming in are equal, the charge on the integrating capacitor 268 is not changed. If pulse 96 becomes larger, diode 252 will conduct more, and current will flow, making point 280 more positive and conversely when tube 256 conducts, heavier current flowing through the tube will remove charge from the integrating capacitors 268 and 270, making point 280 less positive. This change in the charge on the condensers will be proportional to the relative areas of the two negative pulses 96 and 98. This much of the circuit constitutes the integrator portion.

The action of the cathode follower along with condensers 268 and 270 and resistor 264 provide the velocity-memory feature. The voltage output of the integrator at point 280 (the grid of the cathode follower) will be larger than that at point 282, since it will divide between the two capacitors 268 and 270 in proportion to their size. The voltage at point 284 will be the same as at point 280, since in a cathode follower the cathode will stay with the grid. Therefore, if point 280 should be positive, point 284 will be positive the same amount, and more positive than point 282. Charging current will now flow from point 284 through resistor 264 to increase the charge on capacitor 270. This increase will be coupled through capacitor 268 to point 280, raising the grid of cathode follower 272 more, which will bring the cathode 284 up more, and this cycle will continue increasing the output at 280 after the pulses 96 and 98 end. This increase will be proportional to the voltage corrections at point 280 and the RC time constant of resistor 264 and capacitor 270.

In the same way if the charge on capacitor 268 should decrease, reducing the potential at point 280, the potential at point 282 would not decrease as much, and current would flow in the opposite direction through resistor 264 to reduce the voltage at point 282. This reduction is coupled through capacitor 268 to 280 lowering the grid of cathode follower 272 in turn lowering the cathode 284 which causes more current to flow reducing the voltage at 282 more so the output at 280 keeps going down. Thus at the time of each sine pulse the voltage at point 280 is set by the action of the integrator tubes 252 and 256 depending on the pulses 96 and 98 from the coincidence tubes. Between pulses the action of the velocity memory circuit described above changes the voltage in a direction corresponding to the previous sense, and at a rate depending on the corrective voltage applied at the time of each pulse 106. If the corrective voltage at any particular pulse is large then the difference in potential between points 282 and 284 will increase and cause condenser 278 to charge or discharge more rapidly.

This action is illustrated in Fig. 8, in which the solid curve 500 is the ideal one desired. The stepped curve 502 shows how this is approximated by the integrator circuit without the memory or prediction, while the curve 504 shows the improved result given by the memory feature. It should be remembered that the steps in this curve are exaggerated to show the action involved and in actual use corrections are applied at a very much faster rate, actually at the radar repetition frequency, and the curve 504 will be much closer to the ideal sine wave output 500. The output 502 even without the velocity memory feature could be used, but would not be as close to the desired wave 500 since the voltage between pulses remains constant, causing more pronounced steps which depart more from the ideal wave. The fact that corrections are made at the repetition rate of the radar, instead of at 60 cycles as in my prior case, Serial No. 631,746 is another advantage of the present circuit.

The narrow tolerance gate 76 (see Figs. 3 and 6) discussed earlier is taken off at the beginning of the delay line 78 through coupling condenser 228. This tolerance gate, starting approximately 25 microseconds before the sine pulse, and lasting 50 microseconds, normally brackets the sine pulse when it occurs. Referring now to Fig. 9, it is fed back to the sine gated tube 300 in the sequence gating circuit there shown. The operation of this circuit is similar to the one disclosed in my copending application, Serial No. 631,746 referred to above. The main difference occurs in the sine gated tube 300 and the cosine gated tube 302 with associated circuits shown in Fig. 9.

To better show the use of the tolerance gate the operation of the entire sequence gating circuit will be discussed. This sequence gating circuit produces a series of gates and pulses which control the order or sequence of the action of the sync data. The sync data consisting of a basic pulse, sine pulse, cosine pulse, and trigger pulse come in at 304. The basic pulse 12 coming in causes tube 306 to conduct and apply a negative trigger to the grid of tube 308B of the multivibrator 308. The multivibrator 308 is a flip-flop one, and provides a positive 600 microsecond gate starting at the time of the basic pulse 12, which is applied at point 314 to the second and fourth grids of the sine gated tube 300. The sine pulse 14 coming in is applied to the first grid of tube 300 through capacitor 316.

The tolerance gate 76 comes in at terminal 318 and is applied to the #3 grid of the sine gated tube 300. With the tolerance gate on #3 grid and the 600 microsecond sequence gate on #2 and #4 grids, tube 300 will conduct at the time of the sine pulse, and apply a negative trigger pulse to the grid of tube 320B which operates the same as tube 308 and applies a 600 microsecond positive gate 24 at point 322 to the second and fourth grids of tube 302. A cosine tolerance gate 30 similar to sine tolerance gate 76 is applied to #3 grid of tube 302, and when the cosine pulse 16 comes in through capacitor 324, tube 302 will conduct and pass a negative trigger through capacitor 326 to the grid of tube 328A, which triggers the phantastron circuit including tube 303. The phantastron circuit puts out two 2500 microsecond negative gates starting at the time of the cosine pulse. One gate produced at point 334 goes to the trigger circuit 338 which also receives the radar trigger from terminal 304 and from these two provides a trigger for the indicator sweeps, and the other developed at point 336 by tube 328B acting as a cathode follower is fed back to the gate tube 306 at point 340 to cut the tube off till just before the time of the next basic pulse, so that no more pulses simulating sync pulses during the video period will affect the circuit until the time for the next basic pulse.

In my earlier system where only the 600 microsecond sequence gate and actual sine pulse were required to operate the sine gated tube 300 it was much easier for a spurious pulse to trigger the tube and continue the cycle so that the phantastron tube 330 could be triggered to block sync operation for 2500 microseconds after the cosine pulse, so that the system in addition to being more susceptible to spurious pulses, might even take longer to lock in. With my present invention, by requiring triple coincidence including the tolerance gate described, the time the sine gated tube can operate is limited to a short period of time around the point where the sine pulse would come in during normal operation, thus reducing the chance of spurious signals affecting the circuit. In addition, if coincidence is not obtained with either the sine pulse or cosine pulse, the circuit does not block as easily by triggering of the phantastron from a spurious sine or cosine pulse but rather remains receptive to catch the next basic pulse. Thus my invention provides a more accurate system of synchronization.

One difficulty which may arise in using the tolerance gate is that if a very large number of sync pulses should be missed (in this case more than half) the error in the tolerance gate position due to the accumulative error in the operation of the prediction circuit might become greater than the tolerance allowed by the narrow gate. I provide a still further improvement, whereby in such an eventuality the bias on the #3 grid of the gated tube is so changed that the tolerance gate potential is not required to enable the coincidence tube to operate. In other words, at such time only a double instead of a triple coincidence is required. This automatically allows the sequence circuit to lock in and then the bias is automatically changed again so that the tolerance gate (i. e. triple coincidence) once more is used. This method of automatically controlling the use of the tolerance gate is accomplished by the coincidence bias changing circuit centered around tubes 340A and 340B in Figure 9.

This circuit consists of two triodes 340A, 340B, and triode 342 connected as a diode. Tube 340A is connected from B+ through resistors 354, 352, and 350 to ground. Pulses from the cos blocking oscillator corresponding to the sine blocking oscillator 290 in Fig. 6, occurring at the time of the cos pulse are brought in on the grid of tube 340A which is biased by resistors 346 and 348 which tie to a negative potential and also tie from the common connection point 372 to a common point 374 between resistors 350 and 352 so that resistor 350 will affect the conduction of tube 340A. Tube 340B connects from B+ through resistor 362 to ground and receives its grid bias from the coincidence bias condenser 356 which is connected from a common point between resistors 352 and 354 to ground. The plate of tube 340B connects through resistor 358 and clamper tube 342 to point 382 on the voltage divider composed of resistors 364, 366, 368 and 370. It is also connected through resistors 358 and 360 to the #3 grid of the sine gated tube 300.

Pulses come in from the blocking oscillator at terminal 344 each time a cos pulse is received and charge capacitor 356 proportional to the number of cos pulses coming in at point 344. Although cosine pulses are employed here, sine pulses could be used equally as well. When cos pulses are being received normally capacitor 356 will charge the most and increase the plate to cathode current flow in triode 340B causing its plate voltage to drop, which will lower the level of grid #3 in the sine gated tube 300 so that tolerance gates will be necessary to allow the tube to conduct. Tube 342 acts a a clamper in case the plate voltage of 340B goes below the bias of #1 grid in tube 300 which is obtained at point 382 on the divider made up of resistors 364, 366, 368 and 370. When such occurs, tube 342 will conduct and clamp the voltage at point 376 to the voltage at point 362. Resistor 358 is very large to prevent tube 342 from drawing any amount of current which would affect the voltage at point 362.

When the repetition rate or number of pulses coming in at point 344 reduces, capacitor 356 will not charge as much, and therefore tube 340B will conduct less and its plate voltage rises, thus bringing up the voltage on grid 3 of gated tube 300. Resistor 350 can be adjusted so that if a certain amount of sync pulses are missed the voltage on the plate of tube 340B will become high enough to eliminate the need of the tolerance gate, so the sine gated tube can fire when coincidence occurs between the sine pip and sequence gate. In this way the circuit can automatically correct itself should the predicted gate become inaccurate from the loss of too many sync pulses.

It is believed that the construction and operation, as well as the advantages of my improved angle data transmission system, will be apparent from the foregoing description thereof. It will also be apparent that while I have shown and described my invention in a preferred form, many changes may be made in the circuit shown, without departing from the spirit of the invention as sought to be defined in the following claims.

What is claimed is:
1. In an angle data transmission system having a transmitter pulse modulated by a basic pulse, a sine pulse and a cosine pulse, said sine pulse and cosine pulse being time modulated relative to said basic pulse in accordance with the angle to be transmitted, apparatus for excluding spurious pulses which depart from the time position of a data pulse by more than a predetermined tolerance comprising a coincidence circuit, means to generate a narrow gate having a time duration of said predetermined tolerance, means responsive to the rate of change of time modulation of preceding data pulses to predict the approximate time position of succeeding data pulses, means to time the occurrence of said tolerance gate to predict the time of occurrence of said data pulses in response to said second named means, means to apply incoming pulses and said tolerance gate to said coincidence circuit, whereby said coincidence circuit produces an output pulse only in the event of time coincidence of said incoming pulse and said tolerance gate, and means to bias said coincidence circuit to produce an output signal in response solely to incoming pulses in the event of failure to receive a predetermined number of successive data pulses.

2. In an angle data transmission utilizing a pulse train comprising in sequence a basic pulse, a sine pulse time modulated therefrom in accordance with the sine of the angle to be transmitted and a cosine pulse time modulated relative to said sine pulse in accordance with the cosine of the angle to be transmitted, apparatus for excluding spurious pulses comprising first and second triple coincidence circuits, means responsive to said basic pulse for generating a first rectangular wave having a time duration long enough to overlap a succeeding sine pulse, means responsive to said sine pulse for generating a second rectangular wave having a time duration long enough to overlap a succeeding cosine pulse, means responsive to a preceding sine pulse for generating a first time duration voltage square wave gate delayed in time to approximate the time of occurrence of a succeeding sine pulse, means responsive to a preceding cosine pulse for generating a second short time duration voltage square wave gate delayed in time to approximate the time of occurrence of a succeeding cosine pulse, means for applying sine pulses, said first short time gate and said first rectangular wave to said first triple coincidence circuit whereby said coincidence circuit produces an output signal only in the event of triple coincidence of a sine pulse, a first short time gate and a first rectangular wave and means for applying cosine pulses, said second short time gate and said rectangular wave to said second triple coincidence circuit, whereby said second coincidence circuit produces an output signal only in the event of triple coincidence of a cosine pulse, a second short time gate and a second rectangular wave.

3. Apparatus as defined in claim 2, means responsive to the time of occurrence of said sine pulses for cumulatively charging a capacitor biasing said coincidence circuits such that failure to receive a predetermined number of successive sine pulses biases said coincidence circuit to conduction without said first time duration voltage square wave gate.

4. In a data transmission system in which the angular disposition of a remote rotating directional antenna is transmitted to a receiver in the form of a repetitious pulse trains including in sequence a basic pulse, a sine pulse cyclically timed modulated in accordance with the sine of the angle being transmitted about a first point in said pulse train displaced a fixed amount from said basic pulse, and a cosine pulse cyclically time modulated in accordance with the cosine of the angle being transmitted about a second point in said pulse train displaced a fixed time from said first point, apparatus for excluding spurious pulses which depart from the proper time intervals between said basic pulse and said sine pulse and said sine pulse and said cosine pulse by more than a predetermined time tolerance comprising, in combination, a pair of coincidence circuits, means for generating a first and second gate pulse, said gate pulses having a time duration substantially equal to said time tolerance, means responsive to the time separations between the basic pulse and the sine pulse and the sine pulse and the cosine pulse in preceding pulse trains for developing first and second quadraturely phased sine waves, the frequency of which corresponds to the cyclic frequency at which said sine and cosine pulses are time modulated about said first and second points and the amplitudes of which are related to the time separations between the basic pulse and the sine pulse and the sine pulse and the cosine pulse, means for controlling the time of occurrence of said first gate pulse such that said gate pulse is displaced from said first point by an amount and in a direction determined by the amplitude and sense of said first sine wave, and means for controlling the time of occurrence of said second gate such that second gate pulse is displaced from said second fixed point by an amount and in a direction determined by the amplitude and sense of said second sine wave, and means for applying said first gate pulse and said sine pulse to one of said coincidence circuits and said second gate pulse and said cosine pulse to the other of said coincidence circuits to thereby produce first and second output pulses in the event of time coincidence of said first gate pulse and said sine pulse and said second gate pulse and said cosine pulse, respectively.

5. In a data presentation system in which target information obtained by a first radar set is transmitted to a remote receiver in the form of pulse trains including, in sequence, a reference pulse, a first antenna position pulse time modulated from said reference pulse in accordance with the sine of the angle formed by the directivity axis of the rotating directional antenna of said radar set and a reference direction, a second antenna position pulse time modulated from said first antenna position pulse in accordance with the cosine of said angle, a trigger pulse in time synchronism with the radiation of the search pulse from said antenna and video pulses representing echo signals detected by said antenna, means for controlling a commencement of the sweep of the cathode ray tube indicator forming the display portion of said remote receiver comprising, in combination, a pulse generating circuit responsive to the reception of a reference pulse for producing a first gate pulse, said gate pulse commencing at the time of reception of said reference pulse and extending through a time duration sufficient to include the time of occurrence of a first antenna position pulse having the maximum displacement from said reference pulse, means responsive to the production of said first gate pulse for generating a first narrow tolerance gate pulse whose time of occurrence is varied over the duration of said first gate pulse in accordance with the predicted position of the next first antenna position pulse, a first coincidence circuit responsive to the conjoint presence of a first gate pulse, a first narrow tolerance gate pulse and a first antenna position pulse for generating a third gate pulse, said third gate pulse commencing at the time of reception of said last-mentioned first antenna position pulse and extending for a time duration sufficient to include the time of occurrence of a second antenna position pulse having the maximum displacement from said first antenna position pulse, means responsive to the production of said third gate pulse for generating a second narrow tolerance gate pulse whose time of occurrence is varied over the duration of said third gate pulse in accordance with the predicted position of the next second antenna position pulse, and a second coincidence circuit responsive to the conjoint presence of a third gate pulse, a second narrow tolerance gate pulse and a second antenna position pulse for generating a fifth gate pulse, and means responsive to the conjoint presence of a fifth gate pulse and a trigger pulse for starting the sweep of said cathode ray tube indicator.

6. In a system as defined in claim 5, means responsive to the failure of said first coincidence circuit to generate a third gate pulse after the reception by said receiver of a number of pulse trains for altering the operation of said coincidence circuit whereby it generates a third gate pulse in response to the conjoint presence of only a first gate pulse and a first antenna position pulse.

7. Apparatus as defined in claim 5 wherein said fifth gate pulse is employed to block said pulse generating circuit for a time interval such that spurious pulses present in that portion of the pulse train assigned to the video pulses are incapable of rendering said pulse generating circuit operative.

8. In a system as defined in claim 5, means responsive to the absence at said remote receiver of a number of reference pulses from the pulse train for permitting said coincidence circuit to generate a third gate pulse in response to the conjoint presence of only a first gate pulse and a first antenna position pulse, said means being thereafter responsive to the presence of reference pulses in said pulse train for reestablishing the normal requirement of operation of said coincidence circuit whereby it generates a third gate pulse in response to the conjoint presence of a first gate pulse, a first narrow tolerance gate pulse and a first antenna position pulse.

9. In a system in which target information obtained by a first radar set is transmitted to a remote receiver in the form of pulse trains including in sequence at least a reference pulse, a first antenna position pulse time modulated from a point displaced a fixed amount from said reference pulse in accordance with the sine of the angle formed by the directivity axis of the rotating directional antenna of said radar set and a reference direction, a second antenna position pulse time modulated from said first antenna position pulse in accordance with the cosine of said angle and a trigger pulse in time synchronism with the radiation of the search pulse from said antenna, means for controlling the commencement of the sweep of the cathode ray tube indicator of the remote receiver and for maintaining said sweep in rotational synchronism with said directivity axis comprising in combination means at said receiver responsive to said pulse trains for developing first and second substantially sinusoidal wave forms, said wave forms being in a quadrature phase relationship and the amplitudes thereof being approximately proportional to the time displacement between the reference pulse and the first antenna position pulse and the first antenna position pulse and the second antenna position pulse, respectively, means for generating relatively narrow first and second tolerance gate pulses, means responsive to the amplitudes of said first and second wave forms for timing the occurrence of said first and second tolerance gate pulses with respect to said reference pulse and said first antenna position pulse, respectively, a first coincidence circuit, means for feeding said pulse trains and a first tolerance gate pulse to said coincidence circuit whereby an output pulse is produced by said coincidence circuit whenever a first antenna position pulse coincides with a first tolerance gate pulse, a second coincidence circuit, means for feeding said pulse trains, the output pulse of said first coincidence circuit and a second tolerance gate pulse to said second coincidence circuit whereby a control pulse is generated by said second coincidence circuit when there is triple coincidence between a second antenna position pulse, an output pulse from said first coincidence circuit and said second tolerance gate pulse, means responsive to the concurrent occurrence of a control pulse from said second coincidence circuit and a trigger pulse for initiating the sweep of said cathode ray tube indicator, and means controlled by said sinusoidal wave forms for rotating the radial sweep of said cathode ray tube whereby said sweep is maintained in synchronism with the directivity axis of the remote rotating antenna.

References Cited in the file of this patent

UNITED STATES PATENTS

| | | |
|---|---|---|
| 2,368,448 | Cook | Jan. 30, 1945 |
| 2,412,994 | Lehmann | Dec. 24, 1946 |
| 2,426,201 | Grieg | Aug. 26, 1947 |
| 2,455,265 | Norgaard | Nov. 30, 1948 |
| 2,489,948 | Bell | Nov. 29, 1949 |
| 2,516,356 | Tull et al. | July 25, 1950 |
| 2,776,427 | Bedford | Jan. 1, 1957 |

FOREIGN PATENTS

| | | |
|---|---|---|
| 510,881 | Great Britain | Aug. 8, 1939 |